Oct. 20, 1931.   F. R. OBERDIER   1,828,677
HYDRAULIC CLUTCH
Filed March 15, 1929    3 Sheets-Sheet 3
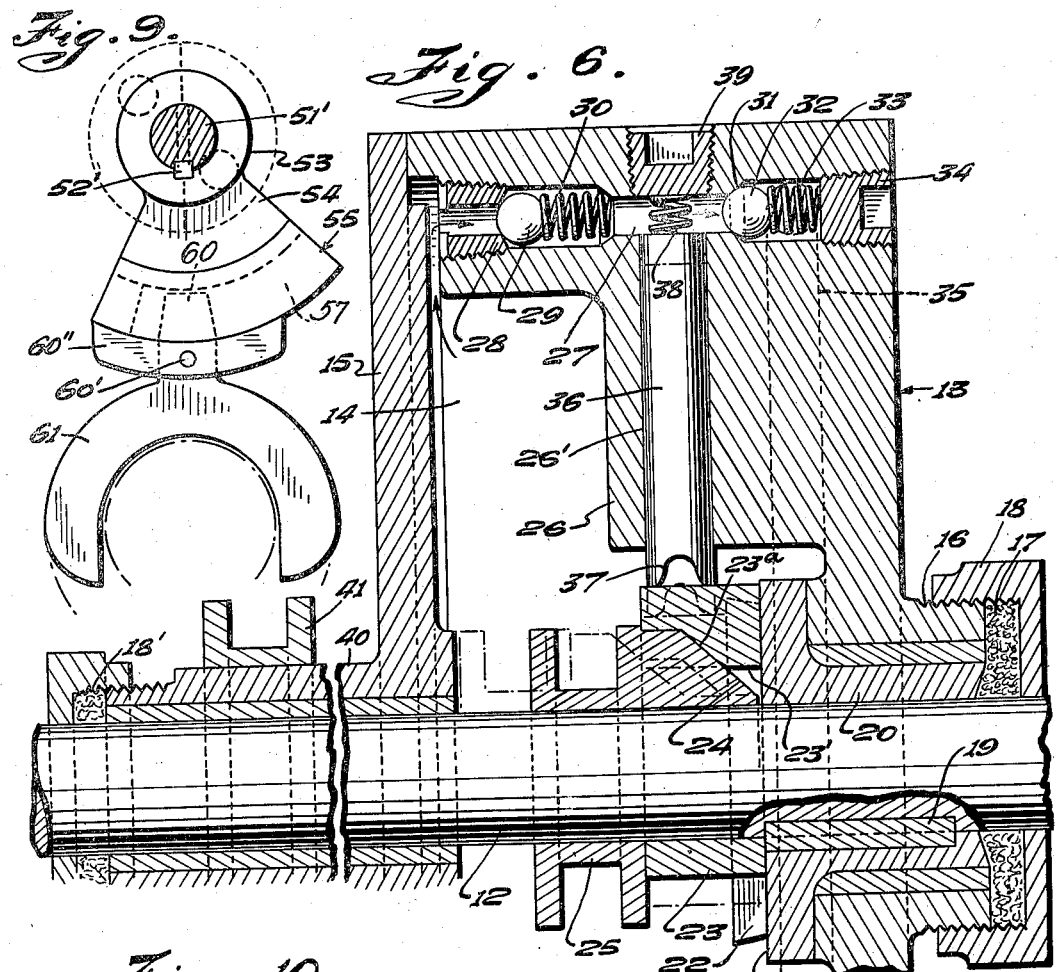
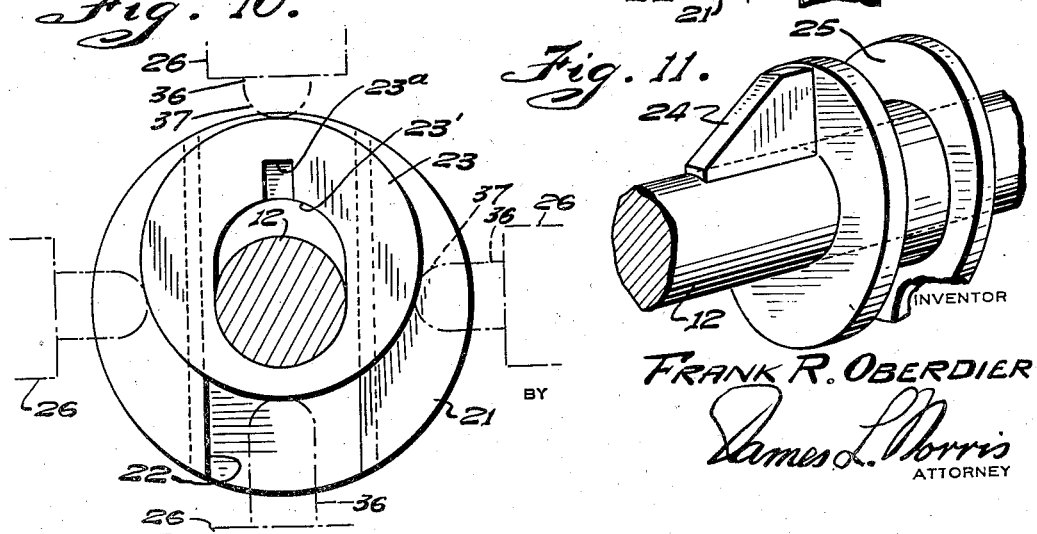
INVENTOR
FRANK R. OBERDIER
BY
James L. Norris
ATTORNEY Patented Oct. 20, 1931

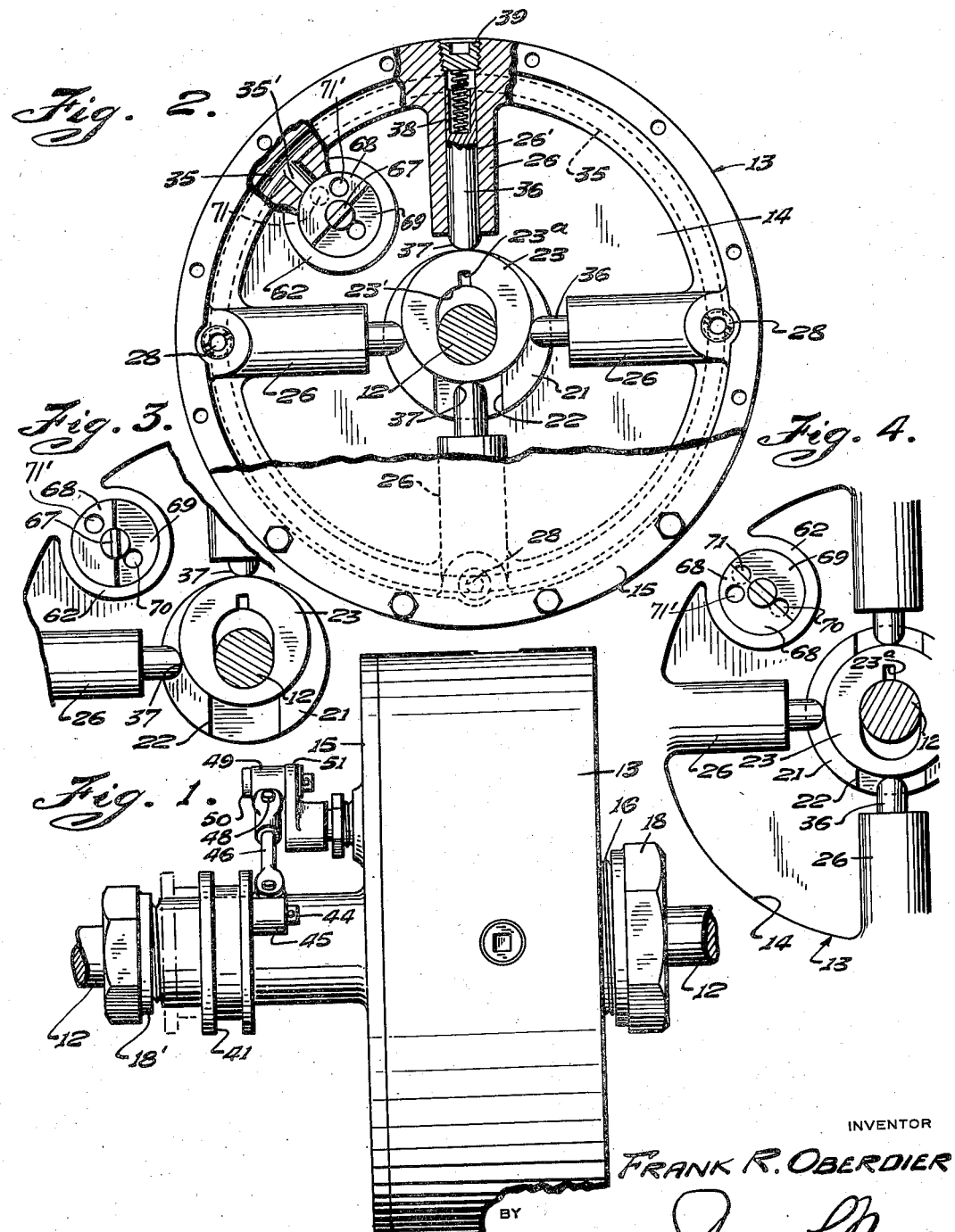

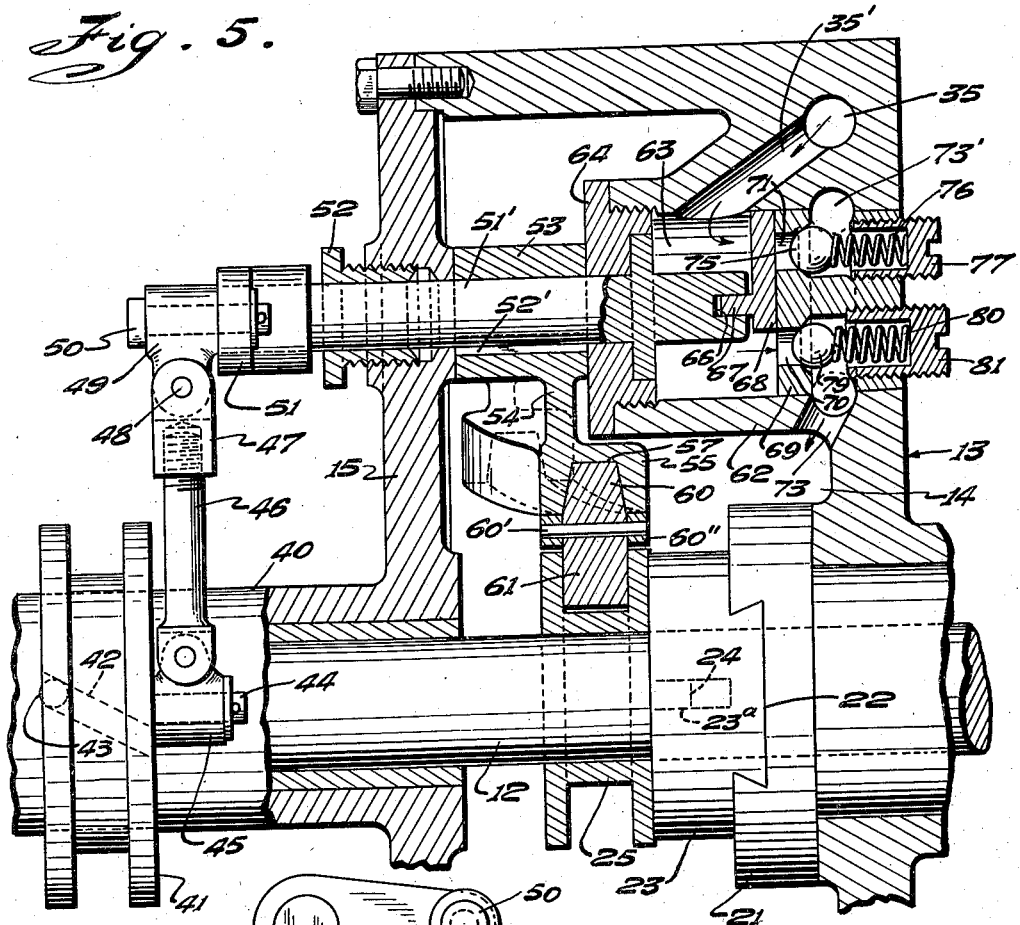

1,828,677

UNITED STATES PATENT OFFICE

FRANK R. OBERDIER, OF LAFAYETTE, OHIO, ASSIGNOR, BY MESNE ASSIGNMENTS, TO HIMSELF AND WILLIAM D. WOOD, BOTH OF LAFAYETTE, OHIO

HYDRAULIC CLUTCH

Application filed March 15, 1929. Serial No. 347,291.

This invention relates to improvements in hydraulic clutches, one object of the invention being the provision of a clutch especially adapted for use in connection with hoisting engines, or in fact wherever it is desired to produce an elastic transmission means between a driving and a driven element, the present device being so constructed that the torque or pull may be regulated so as to be released when the maximum torque is reached, thus avoiding damage to the machinery or mechanism driven through such clutch.

Another object of the invention is the provision of a hydraulic clutch embodying adjustable piston actuating means to vary the throw of the pistons and the consequent regulation of the fluid or liquid pressure in combination with means for regulating the flow under pressure and the consequent transmission effect between the driving and the driven element.

Still another object of this invention is the provision of means whereby the flow control mechanism may be set permanently or may be made adjustable or operated selectively as desired, such mechanism being connected to control the piston actuating member and thus regulate the throw of the pistons in accordance with the pressure desired.

In the accompanying drawings,

Figure 1 is a side elevation of the complete clutch, a portion of the casing being broken away at one corner;

Figure 2 is an end view of the casing a portion of the cover being removed and portions of other parts being shown in section to illustrate the relative positions of such parts;

Figure 3 is a detail view of a portion of the pressure regulating mechanism;

Figure 4 is a view similar to Figure 3 showing the parts in another position;

Figure 5 is a detail cross sectional view on a larger scale through part of the casing adjacent the pressure fluid adjusting means;

Figure 6 is a view similar to Figure 5 through one of the pump cylinders;

Figure 7 is a detail view showing the means for controlling the adjustable pressure controlling valve;

Figure 8 is a detail view of the cam for actuating the plunger or pump actuating annulus showing the pin in various positions in the cam groove thereof;

Figure 9 is a view in elevation of the cam and the yoke for operating the annulus;

Figure 10 is an end view of the piston actuating annulus and the member by which it is carried;

Figure 11 is a perspective view of a portion of the shaft and the annulus actuating member carried thereby.

Referring to the drawings, the numeral 12 designates the shaft, which may be the driving or the driven element, and 13 the casing which, where the shaft is the driven element, is the driving element, or vice versa.

The casing 13 comprises an end wall and a cylindrical side wall formed preferably integrally with said end wall, said end and side walls forming a chamber 14. The opposite end of the casing 13 is closed by a removable lid or cover 15. An extremely threaded boss 16, through which the shaft 12 extends, projects outwardly from the center of the end wall of the casing and a packing 17 is compressed against the end of said boss around the shaft 12 by a nut 18 mounted on said boss.

A boss 40, extending outwardly from the center of the cover 15 and surrounding the shaft 12, has external screw-threads adjacent its free end, and a nut mounted on said screw-threads compresses a packing 18' around the shaft 12 against the end of said boss. The packings 17 and 18' thus maintain liquid-tight joints between the shaft 12 and the end wall of the casing 13 and the cover 15, respectively.

A sleeve 20 surrounding the shaft 12 and extending into the boss 16 is secured to said shaft by a key 19. A disk 21 carried by the forward end of the sleeve 20 within the casing 13 has a diametrical groove in its face which is directed toward the cover 15, and the lateral walls of said groove are undercut as at 22.

An annulus 23, having an elongated diametrical opening 23', through which the shaft 12 extends, has a diametrical projection on its face which is directed toward the disk 21. Said projection extends in the same direction as the opening 23' and is shaped to slide between the undercut side walls 22 of the groove of the disk 21. Thus the annulus 23 is shiftable diametrically of the disk 21 and shaft 12 within the limits of the elongated opening 23'. A radial groove 23ª formed in the other face of the annulus 23 at one end of the opening 23' has its rear wall inclined from said face toward said opening for the reception of the cam or wedge 24 which is carried by the grooved spool 25 longitudinally slidable upon, yet rotatable with, the shaft 12 and the operation of which will be presently set forth.

A plurality of projections 26, extending radially from the side wall of the casing, each has a longitudinal bore 26' which terminates in a cross bore 27 formed in the side wall of the casing. Each bore 27 has mounted in one end and communicating with the chamber 14 a removable ported valve seat 28 and a ball 29 normally held against said seat by a spring 30 acts as a check valve to prevent back pressure of the liquid under pressure. The opposite end of the bore 27 is provided with a valve seat 31 and a ball 32 is normally held against said seat by a spring between said ball and a plug 34 adjustable in an opening in the end wall of the casing. Thus liquid under pressure may be drawn through the ported valve seat 28 and ejected through the seat 31 into a conduit or passageway 35 extending circumferentially of the casing adjacent its end wall. It will thus be seen that the two check valves 29 and 32 act in opposite directions relatively to the bores 26'.

Pistons 36 work, respectively, in the bores 26' and their inner ends are held in engagement with the periphery of the annulus 23 by springs 38, of which the ends bear respectively against the outer ends of the pistons 26' and screw plugs 39 in screw-threaded openings formed in the side wall of the casing in alignment with the bores 26'. Thus the pressure exerted by the springs 38 on the outer ends of the pistons 26' may be adjusted by screwing the plugs 39 into or out of said openings. When the annulus 23 is shifted on the disk 21 radially of the shaft 12 into a position eccentric to the shaft, as shown in Figures 2, 3 and 10, it will, during the rotation of said shaft, act as a cam and thus successively move the pistons 36 toward the side wall of the casing in opposition to the springs.

When the pistons 36 are moved by the springs 38 toward the shaft 12 they will draw fluid into the bores 27 and 26' past the valves 29 and, when they are moved in the opposite direction by the annulus 23, they will expel such liquid from said bores past the valves 32 into the passageway 35. If the annulus 23 is positioned concentrically with the shaft the pistons 36 will remain inactive. A spool 41 is longitudinally slidable on the boss 40 of the lid or cover 15. A pin 43 carried by the boss 40 extends into a groove 42 formed in the inner periphery of the spool 41 and extends obliquely to the ends of said spool so that, when the spool 41 is shifted longitudinally of the boss 40, it will be partially rotated. A pin 44 is carried by one end of the spool 41 and a sleeve 45 is mounted on said pin. The sleeve 45 is connected by a link 46, coupling 47, pin 48, sleeve 49 and pin 50 to a lever 51 carried by a shaft 51', so that, when the spool 41 is partially rotated it will rock the shaft 51'. The shaft 51' extends through a stuffing box 52 in the cover 15, and a sleeve 53 is secured to said shaft within the casing 14 by a key 52'. Said sleeve has a web 54 which carries a cam 55 (Figures 5, 8 and 9) having an arcuate face concentric with the shaft 51' and provided with a zig-zag groove 57 (Figure 8). An arcuate guide member 60" having a face shaped to ride upon the arcuate face of the cam 55 has an aperture between its ends, and a yoke 61, which extends into the groove of the spool 25, has a pin 60 projecting upwardly therefrom through said aperture into the zigzag groove 57 of the cam 55. A pin 60' extending transversely of the pin 60 and guide member 60" secures the yoke to said guide member.

Thus, when the shaft 51' is rocked in a clockwise direction, as viewed from the left hand end of Figure 5, the yoke 61 is moved toward the end wall of the casing 13 to shift the spool 25 from the broken line position to the full line position shown in Figure 6 and thus project the wedge 24 of said spool into the groove 23ª of the annulus 23 and shift said annulus into eccentricity to the shaft 12, as shown in Figures 2, 5 and 6.

A chamber 63 is provided in a hollow boss 62 formed on the inner side of the end wall of the casing 13, and the conduit 35 communicates with said chamber through a conduit 35'. The forward end of the chamber 63 is closed by a screw plug 64 having a central opening through which the shaft 51' extends.

The shaft 51' has a groove 66 extending diametrically of its end, which groove straddles a complementally shaped projection 67 on a rotatable semi-circular disk valve 68, the purpose of which will appear later.

A screw threaded opening in the end wall of the casing, concentric with and preferably of substantially the same diameter as the chamber 63, is closed by a screw plug 69. The plug 69 has a pair of diametrically disposed longitudinal bores which are reduced in diameter adjacent their forward ends forming ports 70 and 71 and valve seats. An annular passageway 73', formed by a circumferential groove on the plug 69 and a complemental peripheral groove in the wall of the opening in which said plug is mounted, communicates with the chamber 14 through a passageway 73 and also communicates with said ports 70 and 71. A ball 75 is normally held seated against the valve seat of the port 71 by a spring 76 between said ball and a plug 77 screwed into the rear end of the bore which forms the port 71. A ball 79 is normally held seated against the valve seat of the port 70 by a spring 80 between said ball and a second plug 81 screwed into the rear end of the bore which forms the port 70.

The spring 80 is of greater strength than the spring 76 and is so adjusted by the plug 81 that it will not permit the ball 79 to be unseated by the pressure in the chamber 63 unless the port 71 is completely covered or until such pressure is greatly in excess of that required to unseat the ball 75 when the port 71 is uncovered.

The semi-circular disk valve 68 bears against the forward end of the plug 69 and has an opening 71' adapted to be brought into registry with the port 71. The diametrical edge and the port 71' of the disk valve are so related to the shaft 51' and the cam 55 that, when the spool 41 is in its normal position, viz., shifted to the left of the position in which it is shown in Figures 5 and 6, the pin 60 of the yoke 61 will be at the left hand end of the zig-zag slot 57 of said cam (Figure 8), the annulus 23 will be concentric with the shaft 12, and the diametrical edge of the disk valve will extend diametrically of the ports 70 and 71, as shown in Figure 4.

As the spool 41 is shifted to the right toward the position in which it is shown in Figure 5, the shaft 51' and the cam 55 will be rocked to cause the pin 60 of the yoke 61 to travel in the part of the cam groove 57 which is oblique to the axis of the shaft 12, viz. from the position in which it is shown at the left end of Figure 8 to the position in which it is shown in full lines in said figure. The yoke 61 will shift the spool 25 toward the position in which it is shown in Figures 5 and 6 and thus move the annulus radially of the shaft 12 until the pin 60 reaches the position indicated in full lines in Figure 8. During this movement of the annulus 23 the disk valve 68 will be turned until its opening 71' is in registry with the port 71 of the plug 69, as shown in Figure 3. As the shaft 51' is rotated further the pin 60 of the yoke 61 will travel from the position in which it is shown in full lines in Figure 8 along the part of the cam groove 57 which is at a right angle to the shaft 12 into the position in which said pin is shown in broken lines at the right of Figure 8, during which period the opening 71' of the disk valve 68 will be moved past and thus throttle the port 71. The annulus 23 will actuate the pistons 36 and cause them to draw fluid from the chamber 14 into the forward ends of the bores 27 and to expel it through the conduits 35 and 35' into the chamber 63. While the port 71 is uncovered the pressure of the fluid in the chamber 63 will act upon the ball 75 and, when it is sufficient to overcome the spring 76, the ball 75 will be unseated to permit the fluid to flow through the port 71, and passageways 73' and 73 back to the chamber 14. The gradually increasing resistance of the fluid in the bores 26' to the reciprocation of the pistons 36 as the port 71 is gradually covered by the disk valve 68 will gradually cause the casing 13 and shaft 12 to rotate together until the port 71 is fully covered, at which time the casing 13 and shaft 12 will move together so long as the pressure in the chamber 63 is insufficient to unseat the ball 79 against the resistance of the spring 80.

It is possible with the present device to set the annulus 23 in a more or less permanent position for operating the respective pistons 36 and to so adjust the disk valve 68 that power will be transmitted up to a maximum troque, at which time the excessive pressure in the chamber 63, due to the reciprocation of the pistons or plungers 36, will be relieved by the unseating of the high pressure valve 79 and thus permit the desired slip between the driving and the driven elements. This is particularly desirable in taking up slack upon cables of hoisting machinery, for the winding of which the present device is particularly adaptable.

From the foregoing description, taken in connection with the drawings, it is evident that in a hydraulic clutch constructed according to and embodying the present invention the throw of the respective pistons or plungers is controlled by the operator by sliding the spool 41 longitudinally of the boss 40 which simultaneously rocks the shaft 51' and the cam 55, and actuates semi-circular disk 68, by means of which the transmission effect may be varied so that a maximum torque may be taken care of without destructive effect upon the machinery acted upon through this transmission.

It is also apparent that when the disk valve 68 is positioned as shown in Figure 3 to uncover both outlets of the chamber 63, there will be no motion transmitted from the driving to the driven elements, but that as the valve 68 is moved to cover the port 71, the transmission effect will be gradually increased until both the driving and driven elements move at the same speed, this being when the valve 68 has covered the port 71 from the chamber 63.

What I claim is:—

1. A hydraulic clutch, including a shaft and a fluid-containing casing rotatable on said shaft, one of said parts constituting the driving element and the other the driven element; a plurality of pumps within and carried by said casing, each of said pumps having a non-return valve communicating with the casing; an operating element for said pumps actuated by said shaft; a non-return outlet valve in the outlet of each of said pumps; a chamber to which the outlets of said pumps are connected and having a pair of outlet ports discharging into said casing; an outlet valve in each of the outlet ports of said chamber; and means associated with each of the last-named valves for normally holding same in closed position, the holding means of one of said valves being stronger than the holding means of the other of said valves.

2. A hydraulic clutch according to claim 1, including a third valve operable from the exterior of the casing for throttling that outlet port of the chamber which is controlled by the valve to the opening of which the holding means offers the smaller resistance.

3. A hydraulic clutch, including a shaft and a fluid-containing casing rotatable on said shaft, one of said parts constituting the driving element and the other the driven element; a plurality of pumps within and carried by said casing, each of said pumps having a non-return inlet valve communicating with said casing; an operating element common to said pumps and actuated by said shaft; a non-return valve in the outlet of each of said pumps; a chamber into which the outlets of said pumps discharge, said chamber having a pair of outlet ports discharging into said casing; a valve in each of the outlet ports of said chamber; means associated with each of the last-named outlet valves and normally holding said valves against their seats, the holding means of one of the outlet valves of said chamber offering less resistance to the opening of such valve than that offered by the holding means of the other of said valves to the opening of such valve; and means for varying the resistance offered by the last-named holding means to the opening of the valve controlled thereby.

4. A hydraulic clutch including a shaft and a fluid-containing casing rotatably mounted on said shaft, one of said parts constituting the driving element and the other the driven element of said clutch; a plurality of pumps within and carried by said casing, each of said pumps having a non-return inlet valve connected to said casing and a non-return outlet valve; an annulus rotatable with and shiftable into a position eccentric to said shaft for actuating said pumps when one of said clutch elements is rotated; a chamber to which the outlet valves of said pumps are connected, said chamber having a pair of outlet ports discharging into said casing; an outlet valve in each of the outlet ports of said chamber; means associated with each of the last-named valves and normally holding same in closed position; one of said holding means being stronger than the other; a throttling valve for the outlet port of said chamber of which the outlet valve has the weaker holding means; and means including a rock-shaft operable from the exterior of the casing for shifting said annulus into eccentricity to the shaft with which it is associated and moving said throttling valve into closed position.

5. A hydraulic clutch, including a shaft, a casing mounted thereon for independent rotation and constituting a container for a liquid, said casing being provided with a plurality of radial bores and a peripheral channel, said channel being in communication through the end of the bores with the chamber of the casing, and having an outlet in communication with the chamber of the casing, a plurality of spring propelled plungers mounted in said bores, adjustable means mounted upon the shaft for actuating and regulating the throw of the plungers, a hollow projection forming a compartment mounted within the casing and interposed between the annular conduit and the outlet thereof to the chamber, a high pressure and a low pressure valve controlling connection at this point and regulating the pressure at which the plungers are permitted to operate, and manually controlled means for operating the plunger actuator to regulate the throw of the plungers.

6. A hydraulic clutch, including a shaft, a casing mounted thereon for independent rotation and constituting a container for a liquid, said casing being provided with a plurality of radial bores and a peripheral channel, said channel being in communication through the end of the bores with the chamber of the casing and having an outlet in communication with the chamber of the casing, a plurality of spring propelled plungers mounted in said bores, adjustable means mounted upon the shaft for actuating and regulating the throw of the plungers, a hollow projection forming a compartment mounted within the casing and interposed between the annular conduit and the outlet thereof to the chamber, a high pressure and a low pressure valve controlling connection at this point and regulating the pressure at which the plungers are permitted to operate, a manually controlled means for operating the plunger actuator to regulate the throw of the plungers, and a segmental disk valve mounted in the hollow projection and operably connected to the latter means whereby the high pressure and low pressure ports are controlled successively or eliminated.

In testimony whereof I have hereunto set my hand.

FRANK R. OBERDIER.